INVENTOR
JAMES R. KITTRELL
BY
ATTORNEYS

United States Patent Office 3,535,230
Patented Oct. 20, 1970

3,535,230
HYDROCRACKING CATALYST COMPRISING A LAYERED CLAY TYPE CRYSTALLINE ALUMINOSILICATE COMPONENT, A GROUP VIII COMPONENT AND RHENIUM AND PROCESS USING SAID CATALYST
James R. Kittrell, El Cerrito, Calif., assignor to Chevron Research Company, San Francisco, Calif., a corporation of Delaware
Filed Nov. 15, 1968, Ser. No. 776,043
Int. Cl. C10g 37/00
U.S. Cl. 208—60          22 Claims

ABSTRACT OF THE DISCLOSURE

A hydrocracking catalyst comprising a layered clay-type crystalline aluminosilicate cracking component, 0.01 to 2.0 weight percent, based on said cracking component and calculated as the metal, of a hydrogenating component selected from platinum and compounds thereof, palladium and compounds thereof, and iridium and compounds thereof, and 0.01 to 2.0 weight percent, based on said cracking component and calculated as the metal, of a hydrogenating component selected from the group consisting of rhenium and compounds thereof, and processes using said catalyst.

INTRODUCTION

Figure 1:
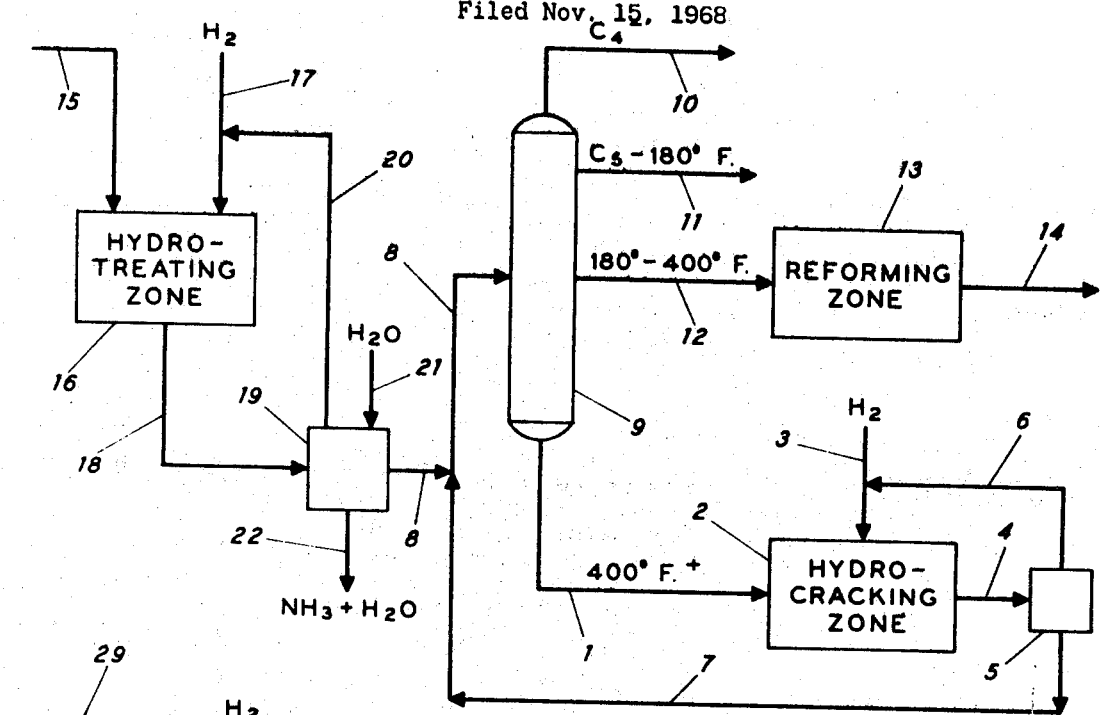

This invention relates to catalytic hydrocracking of hydrocarbons, including petroleum distillates and solvent-deasphalted residua, to produce high-value fuel products, including gasoline.

PRIOR ART

It is well known that a wide variety of crystalline zeolitic molecular sieves may be used as the cracking component of hydrocracking catalysts. It is also well known that the preferred, and most commonly used, hydrogenating components associated with these zeolitic cracking supports are platinum and palladium. Rabo et al. U.S. Pat. 3,236,761, for example, provides a particular type of decationized zeolitic molecular sieve catalyst, which may be used in some reactions without added metals, and in some reactions with added metals. The various applicable reactions are isomerization, reforming, cracking, polymerization, alkylation, dealkylation, hydrogenation, dehydrogenation and hydrocracking. Rhenium is named as a metal with which the molecular sieve may be loaded, but it is not clear from the patent which reactions such a catalyst would be used to catalyze. No example of a rhenium-molecular sieve catalyst is given, and the hydrocracking portion of the disclosure indicates that the molecular sieve catalyst of the patent may be used for hydrocracking without added metals, but preferably with added platinum or palladium if a metal-loaded molecular sieve is to be used. Further, because of the great stress placed by the Rabo et al. patent on Group VIII metals in association with a molecular sieve cracking component, and particularly the noble metals, and the absence of any interest in rhenium except a passing mention, there is no guide in the patent either as to the applicability of a rhenium-molecular sieve catalyst for the hydrocracking reaction in particular, or to the amount of rhenium such a catalyst should contain, or to the hydrocracking results that might be expected.

It is also known in the art to use 2 weight percent rhenium in association with a gel-type silica-alumina cracking component for the hydrocracking of hydrocarbon fractions. For example, Wilson U.S. Pat. 3,278,418 makes such a disclosure. However, it is also known that such a catalyst has low hydrocracking activity, and that a silver promoter must be used with the rhenium to provide a catalyst having acceptable activity. Accordingly, the Wilson patent indicates that the rhenium-silica-alumina catalyst of his Examples 1 and 2 had activity indices of 42 and 47, respectively, whereas with the addition of a silver promoter for the rhenium, activity indices as high as 95 could be achieved. The data in the Wilson patent indicate that with rhenium levels as high as 2 weight percent, the rhenium-silica-alumina hydrocracking catalyst had only moderate hydrocracking activity. A higher hydrocracking activity would have been obtained with a higher rhenium level, but the cost of rhenium makes higher levels undesirable. Wilson was able partially to solve the problem of maintaining low levels of rhenium and adequate hydrocracking activity by adding a second hydrogenation component—silver—to the catalyst. However, this was accomplished only at a sacrifice in catalyst stability. As correctly indicated by Wilson, a hydrocracking catalyst having a silica-alumina cracking component is extremely nitrogen-sensitive, and the hydrocarbon feed hydrocracked in the presence of such a catalyst must be pretreated to reduce the nitrogen content to a low level; more than minor amounts of nitrogen in the hydrocarbon feed have an intolerable poisoning effect on the acid sites of the cracking component of the catalyst, seriously diminishing cracking activity.

It is also known that a crystalline zeolitic molecular sieve cracking component, while relatively insensitive to organic nitrogen compounds and ammonia, has a well-ordered and uniform pore structure as a result of the crystal structure having bonds that are substantially equally strong in three dimensions. This provides definite limitations on the access of reactant molecules to the interiors of the pores.

It is also known, particularly from Granquist U.S. Pat. 3,252,757, that a relatively new crystalline aluminosilicate that has been synthesized has the empirical formula

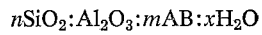

$$n\text{SiO}_2:\text{Al}_2\text{O}_3:m\text{AB}:x\text{H}_2\text{O}$$

where the layer lattices comprise said silica, said alumina, and said B, and where $n$ is from 2.4 to 3.0
$m$ is from 0.2 to 0.6
A is one equivalent of an exchangeable cation having a valence not greater than 2, and is external to the lattice,
B is chosen from the group of negative ions which consists of $F^-$, $OH^-$, $\frac{1}{2}O^{--}$ and mixtures thereof, and is internal in the lattice, and
$x$ is from 2.0 to 3.5 at 50% relative humidity,
said mineral being characterized by a $d_{001}$ spacing at said humidity within the range which extends from a lower limit of about 10.4 A. to an upper limit of about 12.0 A. when A is monovalent, to about 14.7 A. when A is divalent, and to a value intermediate between 12.0 A. and 14.7 A. when A includes both monovalent and divalent cations. The equivalent of an exchangeable cation, A, in said catalyst may be chosen from the group consisting of $H^+$, $NH_4^+$, $Na^+$, $Li^+$, $K^+$, $\frac{1}{2}Ca^{++}$, $\frac{1}{2}Mg^{++}$, $\frac{1}{2}Sr^{++}$, and $\frac{1}{2}Ba^{++}$, and mixtures thereof.

Said synthetic aluminosilicate mineral is a layered clay-type crystalline aluminosilicate, which term as used herein is intended to include dried and calcined forms as well as undried forms of said synthetic mineral, similar synthetic minerals, and corresponding identical and similar natural minerals.

Said aluminosilicate mineral in dried and calcined form is known from U.S. Pat. 3,252,889 to have application as a component of a catalytic cracking catalyst; however, applications of said mineral as a component, in dried or calcined form or otherwise of a hydrocracking catalyst have not been disclosed heretofore.

OBJECTS

In view of the foregoing, objects of the present invention include providing a novel catalyst useful for hydrocracking, and a novel hydrocracking process using said catalyst, said catalyst:

(1) Having a cracking component less sensitive to nitrogen poisoning than silica-alumina gel;

(2) Having a cracking component that is crystalline in structure, having pores elongated in two directions, contrary to the pores of crystalline zeolitic molecular sieves, and therefore having less reactant access limitations than the pores of such molecular sieves;

(3) Having a first hydrogenating component providing increased activity and stability to said catalyst, compared with a similar catalyst not containing said component;

(4) Having a second hydrogenating component providing additional stability to said catalyst, compared with the same catalyst which contains said first hydrogenating component but not said second hydrogenating component.

It is a further object of the present invention to provide various embodiments of a hydrocracking process using a catalyst having the aforesaid characteristics, including methods of further improving catalyst stability, and methods of operating the hydrocracking process in an integrated manner with other process units to achieve various advantageous results.

The present invention will best be understood, and further objects and advantages thereof will be apparent, from the following description when read in connection with the accompanying drawing.

DRAWING

Figure 2:
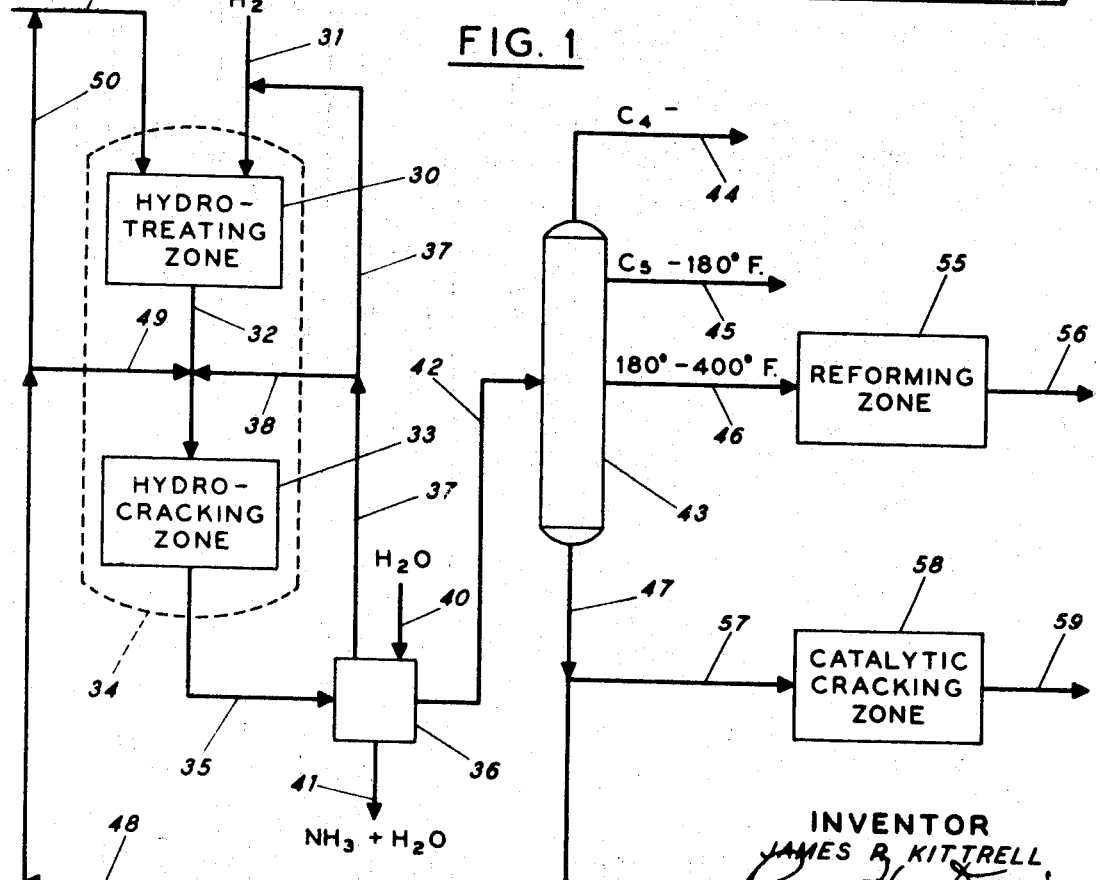

In the drawing, FIG. 1 is a diagrammatic illustration of apparatus and flow paths suitable for carrying out the process of several of the embodiments of the present invention, including embodiments wherein a hydrofining zone preceded the hydrocracking zone, and embodiments wherein a selected fraction from the hydrocracking zone is catalytically reformed;

FIG. 2 is a diagrammatic illustration of apparatus and flow paths suitable for carrying out the process of additional embodiments of the present invention, including embodiments wherein a hydrofining zone precedes a hydrocracking zone in a single reactor shell, and embodiments wherein a selected fraction from the hydrocracking zone is catalytically cracked.

STATEMENT OF INVENTION

It has been found that a catalyst comprising a layered clay-type crystalline aluminosilicate cracking component, namely the layered synthetic clay-type crystalline aluminosilicate mineral of Granquist U.S. Pat. 3,252,757, a hydrogenating component selected from platinum and compounds thereof, palladium and compounds thereof, and iridium and compounds thereof, in an amount of 0.01 to 2.0 weight percent, calculated as metal, and a rhenium or rhenium compound hydrogenating component in an amount of 0.01 to 2.0 weight percent, calculated as metal and based on said cracking component, has all of the desirable catalyst attributes listed under Objects above and, therefore, in accordance with the present invention there is provided such a catalyst and a hydrocracking process using such a catalyst. It is not obvious from Rabo et al. U.S. Pat. 3,236,761 that a rhenium-crystalline zeolitic molecular sieve catalyst has application as a hydrocracking catalyst, or what rhenium levels such a catalyst should contain. It is even less obvious from Rabo et al. that not only should rhenium be used as a component of a hydrocracking catalyst, but that the layered synthetic crystalline aluminosilicate mineral of Granquist U.S. Pat. 3,252,757 could be used instead of a crystalline zeolitic molecular sieve. Even if such matters were clear from Rabo et al., Wilson U.S. Pat. 3,278,418 would lead a man skilled in the art to conclude that such a catalyst would either need to contain *considerably* more than 2 weight percent rhenium or that it must contain a silver hydrogenating component to obtain adequate hydrocracking activity. It has been found that neither of these conclusions is correct. Wilson also would lead a man skilled in the art to conclude, even if he considered use for hydrocracking of the catalyst used in the process of the present invention that use of a hydrogenating component in addition to rhenium, to enable the catalyst to maintain adequate hydrocracking activity at acceptably low rhenium levels, would cause the catalyst stability to suffer markedly. This conclusion also is not correct. Accordingly, it has been found that the catalyst of the present invention surprisingly provides advantages over the Rabo et al. platinum or palladium on molecular sieve hydrocracking catalyst and the Wilson rhenium-silica-alumina hydrocracking catalyst, while unexpectedly being free from disadvantages that the art would lead one to expect. In particular, in the catalyst of the present invention: (1) the presence of the rhenium component results in a catalyst of higher stability than a catalyst that is identical, except that contains no rhenium; and (2) the presence of the component selected from platinum and compounds thereof, palladium and compounds thereof, and iridium and compounds thereof results in a catalyst of higher activity and stability than a catalyst that is identical except that contains no such Group VIII component.

In accordance with the present invention, therefore, there is provided a hydrocracking catalyst comprising a layered, clay-type crystalline aluminosilicate cracking component, 0.01 to 2.0 weight percent, based on said cracking component and calculated as the metal, of a hydrogenating component selected from platinum and compounds thereof, palladium and compounds thereof, and iridium and compounds thereof, and 0.01 to 2.0 weight percent, based on said cracking component and calculated as the metal, of a hydrogenating component selected from rhenium and compounds thereof, said layered aluminosilicate having, prior to drying and calcining of said catalyst the empirical formula

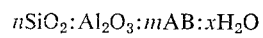

$$n\mathrm{SiO}_2 : \mathrm{Al}_2\mathrm{O}_3 : m\mathrm{AB} : x\mathrm{H}_2\mathrm{O}$$

where the layer lattices comprise said silica, said alumina, and said B, and where $n$ is from 2.4 to 3.0

$m$ is from 0.2 to 0.6

A is one equivalent of an exchangeable cation having a valence not greater than 2, and is external to the lattice, B is chosen from the group of negative ions which consists of $F^-$, $OH^-$, $\frac{1}{2}O^{--}$ and mixtures thereof, and is internal in the lattice, and $x$ is from 2.0 to 3.5 at 50% relative humidity, said material being characterized by a $d_{001}$ spacing at said humidity within the range which extends from a lower limit of about 10.4 angstroms to an upper limit of about 12.0 angstroms when A is monovalent, to about 14.7 angstroms when A is divalent, and to a value intermediate between 12.0 angstroms and 14.7 angstroms when A includes both monovalent and divalent cations.

Further in accordance with the prevent invention there is provided a catalyst effective for various hydrocarbon conversion reactions, including hydrocracking, hydrodesulfurization, hydrodenitrification, hydrogenation and hydroisomerization, comprising:

(A) A layer-type, crystalline, clay-like mineral cracking component which prior to drying and calcining of said catalyst has the empirical formula

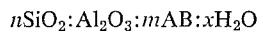

$$n\mathrm{SiO}_2 : \mathrm{Al}_2\mathrm{O}_3 : m\mathrm{AB} : x\mathrm{H}_2\mathrm{O}$$

where the layer lattices comprise said silica, said alumina, and said B, and where $n$ is from 2.4 to 3.0

$m$ is from 0.2 to 0.6

A is one equivalent of an exchangeable cation having a valence not greater than 2, and is external to the lattice, B is chosen from the group of negative ions which consists of F−, OH−, ½O− − and mixtures thereof, and is internal in the lattice, and $x$ is from 2.0 to 3.5 at 50% relative humidity, said mineral being characterized by a $d_{001}$ spacing at said humidity within the range which extends from a lower limit of about 10.4 A. to an upper limit of about 12.0 A. when A is monovalent, to about 14.7 A. when A is divalent, and to a value intermediate between 12.0 A. and 14.7 A. when A includes both monovalent and divalent cations, and (B) A hydrogenating component selected from platinum and compounds thereof, palladium and compounds thereof, and iridium and compounds thereof, in an amount of 0.01 to 2.0 weight percent, based on said cracking component and calculated as metal, and a hydrogenating component selected from rhenium and compounds thereof, in an amount of 0.01 to 2.0 weight percent, based on said cracking component and calculated as metal.

Said cracking component may be present in said catalyst in an amount of 10 to 99.9 weight percent, based on the total catalyst. If desired, said catalyst may further comprise a crystalline zeolitic molecular sieve cracking component in the amount of 1 to 50 weight percent, based on the total catalyst. The equivalent of an exchangeable cation, A, in said catalyst may be chosen from the group consisting of H+, NH$_4$+, Na+, Li+, K+, ½Ca++, ½Mg++, ½Sr++, and ½Ba++, and mixtures thereof.

Said catalyst additionally may comprise a component selected from the group consisting of alumina and silica-alumina and a hydrogenating component selected from the group consisting of Group VI metals and compounds thereof and nickel and compounds thereof. When the catalyst comprises alumina or silica-alumina, titania advantageously may be present also. When the catalyst comprises nickel or a compound thereof, tin or a compound thereof advantageously may be present also. When said catalyst comprises said additional components, preferably the catalyst is prepared by coprecipitation of all non-crystalline components to form a slurry, followed by addition of the layered clay-type crystalline aluminosilicate component (and additionally a crystalline zeolitic molecular sieve component, if desired) to the slurry in particulate form, followed by filtering, washing and drying to produce a hydrogel matrix having said crystalline component (or components) dispersed therethrough. Preferably the finished catalyst will have substantially all of the catalytic metal or metals located in the matrix, and said crystalline component (or components) will be substantially in the ammonia or hydrogen form, and will be substantially free of catalytic loading metal or metals; that is, said crystalline component (or components) will contain less than about 0.5 weight percent of catalytic metal or metals. This result will obtain if addition of said crystalline component (or components) to the slurry of other catalyst components is accomplished at a pH of 5 or above.

Further in accordance with the present invention, there is provided a hydrocracking process which comprises contacting a hydrocarbon feedstock containing substantial amounts of materials boiling above 200° F. and selected from the group consisting of petroleum distillates, solvent-deasphalted petroleum residua, shale oils and coal tar distillates, in a reaction zone with hydrogen and the aforesaid catalyst comprising a layered clay-type crystalline aluminosilicate at hydrocracking conditions including a temperature in the range 400° to 950° F., a pressure in the range 800 to 3500 p.s.i.g., a liquid hourly space velocity in the range 0.1 to 5.0, and a total hydrogen supply rate of 200 to 20,000 s.c.f. of hydrogen per barrel of said feedstock, and recovering from said reaction zone valuable products, including gasoline. The hydrogen feedstock preferably contains less than 1000 p.p.m. organic nitrogen. A prior hydrofining step may be used, if desired, to reduce the feed nitrogen content to the preferred level; however, because of the superior nitrogen tolerance of the layered clay-type crystalline aluminosilicate component, compared with silica-alumina, the hydrofining step need not accomplish complete nitrogen content reduction, as further discussed hereinafter.

Further in accordance with the present invention, advantageous results are obtained by providing in the reaction zone, in addition to said catalyst comprising a layered clay-type crystalline aluminosilicate, a separate second catalyst comprising a hydrogenating component selected from Group VI metals and compounds thereof, a hydrogenating component selected from Group VIII metals and compounds thereof, and a component selected from the group consisting of alumina and silica-alumina. Further in accordance with the present invention, said separate second catalyst may be located in said reaction zone in a bed disposed above said catalyst comprising a layered clay-type crystalline aluminosilicate cracking component. In the embodiments of the present invention discussed in this paragraph, no other prior hydrofining step generally will be necessary, because hydrofining is accomplished in one reaction zone concurrently with hydrocracking, together with some hydrogenation of aromatics.

Still further in accordance with the present invention, there is provided a hydrocracking process which comprises sequentially contacting a hydrocarbon feedstock and hydrogen with a first bed of catalyst and then with a second bed of catalyst, said catalyst beds both being located within a single elongated reactor pressure shell, said first bed of catalyst being located in an upper portion of said shell, the catalyst of said first bed comprising a hydrogenating component selected from the group consisting of Group VI metals and compounds thereof and Group VIII metals and compounds thereof, and a component selected from the group consisting of alumina and silica-alumina, the catalyst of said second bed being said catalyst comprising a layered clay-type crystalline aluminosilicate, maintaining said first bed of catalyst and said second bed of catalyst at a temperature in the range of 400° to 950° F. and a pressure in the range 800 to 3500 p.s.i.g. during said contacting, maintaining the total supply rate of said hydrogen into said reactor shell from 200 to 20,000 s.c.f. of hydrogen per barrel of said feedstock, and recovering a gasoline product from the effluent of said second bed of catalyst.

The hydrocracking zone of the process of the present invention may be operated once through, or advantageously may be operated by recycling thereto materials from the effluent thereof that boil above 200° F., preferably above 400° F. All or a portion of these heavier materials advantageously may be catalytically cracked. The heavy gasoline fraction from the hydrocracking zone advantageously may be catalytically reformed.

HYDROCARBON FEEDSTOCKS

The feedstocks supplied to the hydrocracking zone containing said catalyst comprising a layered clay-type crystalline aluminosilicate in the process of the present invention are selected from the group consisting of petroleum distillates, solvent-deasphalted petroleum residua, shale oils and coal tar distillates. The feedstocks contain substantial amounts of materials boiling above 200° F., preferably substantial amounts of materials boiling in the range 350° to 950° F., and more preferably in the range 400° to 900° F. Suitable feedstocks include those heavy distillates normally defined as heavy straight-run gas oils and heavy cracked cycle oils, as well as conventional FCC feed and portions thereof. Cracked stocks may be obtained from thermal or catalytic cracking of various stocks, including those obtained from petroleum, gilsonite, shale and coal tar. As discussed hereinafter, the feedstocks may have been subjected to a hydrofining and/or hydrogenation treatment, which may have been accompanied by some hydrocracking, before being supplied to the hydrocracking zone containing said catalyst comprising a layered clay-type crystalline aluminosilicate.

NITROGEN CONTENT OF FEEDSTOCKS

While the process of the present invention can be practiced with utility when supplying to the hydrocracking zone containing a catalyst comprising a layered clay-type crystalline aluminosilicate, hydrocarbon feeds containing relatively large quantities of organic nitrogen, for example several thousand parts per million organic nitrogen, it is preferred that the organic nitrogen content be less than 1000 parts per million organic nitrogen. A preferred range is 0.5 to 1000 parts per million; more preferably, 0.5 to 100 parts per million. As previously discussed, a prior hydrofining step may be used, if desired, to reduce the feed nitrogen content to the preferred level. The prior hydrofining step advantageously may also accomplish hydrogenation and a reasonable amount of hydrocracking. Because of the superior tolerance of the layered clay-type crystalline aluminosilicate component for organic nitrogen compounds, compared with silico-alumina, the hydrofining step need not accomplish complete organic nitrogen content reduction. Further, because of the superior tolerance of said component for ammonia, compared with silica-alumina, and because said component is more tolerant of ammonia than of organic nitrogen compounds, ammonia produced in the hydrofining zone either may be removed from the system between the hydrofining zone and the hydrocracking zone containing the hydrocracking catalyst comprising said component, or may be permitted to pass into the hydrocracking zone along with the feed thereto.

SULFUR CONTENT OF FEEDSTOCK

While the process of the present invention can be practiced with utility when supplying to the hydrocracking zone, containing a catalyst comprising a layered clay-type crystalline aluminosilicate, hydrocarbon feeds containing relatively large quantities of organic sulfur, it is preferable to maintain the organic sulfur content of the feed to that zone in a range of 0 to 3 weight percent, preferably 0 to 1 weight percent.

CATALYST COMPRISING A LAYERED CLAY-TYPE CRYSTALLINE ALUMINOSILICATE COMPONENT, A RHENIUM OR RHENIUM COMPOUND HYDROGENATING COMPONENT, AND A HYDROGENATING COMPONENT SELECTED FROM PLATINUM AND COMPOUNDS THEREOF, PALLADIUM AND COMPOUNDS THEREOF, AND IRIDIUM AND COMPOUNDS THEREOF

(A) General

The layered clay-type crystalline aluminosilicate used in preparing the catalyst is the synthetic mineral described above and in Granquist U.S. Pat. 3,252,757 is preferred. This component will be present in the catalyst in an amount of 10 to 99.9 weight percent, based on the total catalyst.

The rhenium hydrogenating component of the catalyst may be present in the final catalyst in the form of the metal, metal oxide, metal sulfide, or a combination thereof. The rhenium or compound thereof may be combined with the layer clay-type crystalline aluminosilicate cracking component, or may be combined with other catalyst components in which said cracking component is dispersed, or both. In any case, the rhenium will be present in an amount of 0.01 to 2.0 weight percent, based on said cracking component and calculated as the metal.

When a conventional crystalline zeolitic molecular sieve cracking component is included in the catalyst, said molecular sieve cracking component may be of any type that is known in the art as a useful component of a conventional hydrocracking catalyst comprising a noble metal or noble metal-compound hydrogenating component. A decationized molecular sieve cracking component is preferred. Especially suitable are faujasite, particularly "Y" type and "X" type faujasite, and mordenite, in the ammonia form, hydrogen form, alkaline earth-exchanged form, or rare earth-exchanged form.

The hydrogenating component of the catalyst that is selected from platinum, palladium, iridium, and compounds of platinum, palladium and iridium may be present in the final catalyst in the form of the metal, metal oxide, metal sulfide, or a combination thereof. This component may be combined with the layerered clay-type crystalline aluminosilicate cracking component, or may be combined with other catalyst components in which said aluminosilicate cracking component is dispersed, or both. In any case, the component will be present in an amount of 0.01 to 2.0 weight percent, based on said aluminosilicate cracking component and calculated as the metal.

A preferred catalyst comprises said layered clay-type crystalline aluminosilicate cracking component intimately dispersed in a matrix of other catalytic components comprising alumina, silica-alumina, or silica-alumina-titania. The rhenium or compound thereof, and the platinum, palladium or iridium, or compound of platinum, palladium or iridium may be combined with said aluminosilicate cracking component before the latter is dispersed in the matrix, or the rhenium or compound thereof and the platinum, palladium or iridium, or compound of platinum, palladium or iridium may be a portion of the matrix. Examples of suitable matrices, in addition to matrices consisting of alumina or silica-alumina, include matrices comprising: (a) palladium or a compound thereof and rhenium or a compound thereof and silica-alumina; (b) palladium or a compound thereof and rhenium or a compound thereof and alumina; (c) iridium or a compound thereof and rhenium or a compound thereof and alumina; (d) iridium or a compound thereof and rhenium or a compound thereof and silica-alumina; (e) platinum or a compound thereof and rhenium or a compound thereof and silica-alumina; (f) any of the foregoing with the addition of nickel or a compound thereof or nickel or a compound thereof plus tin or a compound thereof; if desired, the nickel or compound thereof may be accompanied by a Group VI metal or compound thereof.

(B) Method of preparation

The layered clay-type crytalline aluminosilicate cracking component of the catalyst may be prepared in the manner set forth in Granquist U.S. Pat. 3,252,757.

In the case wherein rhenium or a compound thereof and platinum, palladium or iridium, or compounds of platinum, palladium or iridium are added directly to the layered clay-type crystalline aluminosilicate cracking component, impregnation using aqueous solutions of suitable hydrogenating metal compounds or adsorption of suitable hydrogenating metal compounds are operable methods of incorporating the hydrogenating components or compounds thereof into said aluminosilicate component. Ion exchange methods whereby the hydrogenating components are incorporated into said aluminosilicate component by exchanging those components with a metal component already present in said aluminosilicate component may be used. However, such methods require use of compounds wherein the metals to be introduced into said aluminosilicate component are present as cations. Compounds wherein rhenium is present as a cation are not commonly available in aqueous solution.

In the case wherein said aluminosilicate cracking component first is dispersed in a matrix of other catalytic components and rhenium or a compound thereof and platinum, palladium or iridium, or a compound of platinum, palladium or iridium are introduced into the resulting composition, impregnation using an aqueous solution of suitable hydrogenating component compounds or adsorption of suitable hydrogenating component compounds are the preferred methods.

The rhenium compound used in the impregnation or adsorption step generally will contain rhenium in anionic form. The compound should be one that is soluble in water, and that contains no ions that are known as contaminants in hydrocracking catalysts. Suitable rhenium compounds are perrhenic acid, $HReO_4$, and ammonium perrhenate, $NH_4ReO_4$. Impregnation also may be accomplished with an ammoniacal solution of rhenium heptoxide.

The platinum, palladium or iridium compound used in preparing the catalyst may be any convenient compound, for example platinum, palladium or iridium chloride, tetra ammino palladium nitrate, etc.

Where the layered clay-type crystalline aluminosilicate component, with or without added hydrogenating components, is dispersed in a matrix of other catalyst components, the dispersion may be accomplished by cogelation of said other components around said aluminosilicate component in a conventional manner.

Following combination of the catalyst components, the resulting composition may be washed free of impurities and dried at a temperature in the range 500° to 1200° F., preferably 900° to 1150° F., for a reasonable time, for example 0.5 to 48 hours, preferably 0.5 to 20 hours.

The finished catalyst may be sulfided in a conventional manner prior to use, if desired. If not presulfided, the catalyst will tend to become sulfided during process operation from any sulfur compounds that may be present in the hydrocarbon feed. As discussed elsewhere herein, the equilibrium degree of sulfiding at a given operating temperature will be different than in a corresponding catalytic system wherein a noble metal component alone is present, with no rhenium being present.

SEPARATE HYDROFINING CATALYST

(A) General

As previously indicated, advantageous results are obtained by providing in the reaction zone containing the hydrocracking catalyst of the present invention a separate second catalyst comprising a hydrogenating component selected from Group VI metals and compounds thereof, a hydrogenating component selected from Group VIII metals and compounds thereof, and a support selected from the group consisting of alumina and silica-alumina. Pellets or other particles of this separate second catalyst may be physically mixed with said hydrocracking catalyst, but preferably are disposed in a separate catalyst bed located ahead of said hydrocracking catalyst in the same reactor shell, eliminating interstage condensation, pressure let-down and ammonia and hydrogen sulfide removal. In a preferred arrangement using downflow of hydrocarbon feed, the bed of separate second catalyst is located above said hydrocracking catalyst in the same reactor shell.

Where said separate second catalyst is located in the same reactor shell as the hydrocracking catalyst of the present invention, it is preferably present in an amount in the range of 10 to 40 volume percent of the total amount of catalyst in the reactor.

In an arrangement less preferred than the ones discussed above in this section, the separate second catalyst may be located in a separate hydrofining reactor, operated under conventional hydrofining conditions, from the effluent of which ammonia or hydrogen sulfide, or both, and also hydrocarbon products, if desired, may be removed prior to hydrocracking the remaining hydrofined feedstock in a subsequent hydrocracking reactor in the presence of the catalyst of the present invention.

In any of the arrangements discussed in this section, the separate second catalyst preferably has hydrofining activity and hydrogenation activity, and even more preferably also has enough hydrocracking activity to convert 0.2 to 50, preferably 5 to 20, weight percent of the hydrocarbon feedstock to products boiling below the initial boiling point of the feedstock in a single pass. The hydrogenation activity preferably is sufficient to saturate or partially saturate a substantial portion of the organic oxygen, nitrogen and sulfur compounds in the feed to water, ammonia and hydrogen sulfide.

Preferably, said separate second catalyst contains nickel or cobalt or compounds thereof in an amount of 1 to 15 weight percent, calculated as metal, and molybdenum or tungsten or compounds thereof, in an amount of 5 to 30 weight percent, calculated as metal, with the remainder of the catalyst consisting of alumina, or silica-alumina containing up to 50 weight percent silica.

Particularly preferred examples of said separate second catalyst, comprising silica-alumina, are:

| | Percent by weight of total catalyst, calculated as metal | | | $SiO_2/Al_2O_3$ weight ratio |
|---|---|---|---|---|
| | Ni | Mo | W | |
| (1) | 4–10 | 15–25 | | 10/90–30/70 |
| (2) | 6–15 | | 15–30 | 30/70–50/50 |

It has been found that use of said separate second catalyst increases the gasoline yield from the hydrocracking stage contnaining the catalyst of the present invention, compared with the gasoline yield from the hydrocracking stage when the identical feed thereto has not been first or concurrently processed in the presence of said separate second catalyst. The increased gasoline yield probably is related to the hydrogenation, in that more saturated hydrocarbon structures tend to crack more easily.

(B) Method of preparation

Said separate second catalyst may be prepared by any conventional preparation method, including impregnation of an alumina or silica-alumina support with salts of the desired hydrogenating component, or cogelation of all components, with the latter method being preferred.

As previously pointed out, the hydrocracking catalyst of the present invention has activity and stability advantages over a hydrocracking catalyst comprising rhenium and a gel-type silica-alumina. It has been found that use of said separate second catalyst in the above-described arrangements further increases the stability of the hydrocracking catalyst of the present invention, compared with the stability of the latter catalyst when the identical feed thereto has not been first or concurrently processed in the presence of said separate second catalyst.

OPERATING CONDITIONS

The hydrocracking zone containing the catalyst of the present invention is operated at hydrocracking conditions including a temperature in the range 400° to 950° F., preferably 500° to 850° F., a pressure in the range 800 to 3500 ps.i.g., preferably 1000 to 3000 p.s.i.g., a liquid hourly space velocity in the range 0.1 to 5.0, preferably 0.5 to 5.0, and more preferably 0.5 to 3.0. The total hydrogen supply rate (makeup and recycle hydrogen) to said zone is 200 to 20,000 s.c.f., preferably 2000 to 20,000 s.c.f., of hydrogen per barrel of said feedstock.

Where a separate hydrofining zone, which also may accomplish hydrogenation and some hydrocracking, is located ahead of the hydrocracking zone containing the catalyst of the present invention, the operating conditions in the separate hydrofining zone include a temperature of 400° to 900° F., preferably 500° to 800° F., a pressure of 800 to 3500 p.s.i.g., preferably 1000 to 2500 p.s.i.g., and a liquid hourly space velocity of 0.1 to 5.0, preferably 0.5 to 3.0. The total hydrogen supply rate (makeup and recycle hydrogen) is 200 to 20,000 s.c.f. of hydrogen per barrel of feedstock, preferably 2000 to 20,000 s.c.f. of hydrogen per barrel of feedstock.

Where a separate bed of hydrofining catalyst is located above a bed of the hydrocracking catalyst of the present invention in the same reactor shell, the space velocity through the bed of hydrofining catalyst will be a function of the space velocity through the hydrocracking catalyst bed and the amount of hydrofining catalyst expressed as a volume percent of the total catalyst in the reactor. For example, where the hydrofining catalyst is 25 volume percent of the total catalyst in the reactor, and the space velocity through the bed of hydrocracking catalyst is 0.9, the space velocity through the bed of hydrofining catalyst will be 2.7. Accordingly, the space velocity through the bed of hydrofining catalyst in the process of the present invention may range from 0.15 to 45.0.

The operating conditions in the reforming zone and catalytic cracking zone employed in various embodiments of the present invention are conventional conditions known in the art.

PROCESS OPERATION WITH REFERENCE TO DRAWING

Referring now to FIG. 1 of the drawing, in accordance with a primary embodiment of the present invention, a hydrocarbon feedstock as previously described, which in this case may boil above 400° F., is passed through line 1 into hydrocracking zone 2, which contains a hydrocracking catalyst comprising said layered clay-type crystalline aluminosilicate cracking component, 0.01 to 2.0 weight percent, based on said cracking component, of platinum, palladium or iridium, and 0.01 to 2.0 weight percent, based on said cracking component, of rhenium. As previously discussed, said layered aluminosilicate component may be dispersed in a matrix of other catalyst components, which matrix may contain all or a portion of the hydrogenating components. Also as previously discussed, a separate second catalyst, previously described, may be located in hydrocracking zone 2. The feedstock is hydrocracked in hydrocracking zone 2 at conditions previously discussed, in the presence of hydrogen supplied through line 3. From hydrocracking zone 2 an effluent is withdrawn through line 4, hydrogen is separated therefrom in separator 5, and hydrogen is recycled to hydrocracking zone 2 through line 6. From separator 5, hydocracked materials are passed through lines 7 and 8 to distillation column 9, where they are separated into fractions, including a $C_4^-$ fraction which is withdrawn through line 10, a $C_5$—180° F. fraction which is withdrawn through line 11, and a 180°–400° F. fraction which is withdrawn through line 12.

Still referring to FIG. 1, in accordance with another embodiment of the present invention, the 180°–400° F. fraction in line 12 is reformed under conventional catalytic reforming conditions in reforming zone 13, from which a catalytic reformate is withdrawn through line 14.

Still referring to FIG. 1, in accordance with another embodiment of the present invention, a hydrocarbon feedstock which is to be hydrofined and/or hydrogenated, and partially hydrocracked, if desired, in a separate hydrotreating zone prior to being hydrocracked in hydrocracking zone 2, is passed through line 15 to hydrotreating zone 16 containing a catalyst, as previously described, having hydrofining and/or hydrogenation activity. The feedstock is hydrotreated in zone 16 at conditions previously described, in the presence of hydrogen supplied through line 17. The effluent from hydrotreating zone 16 is passed through line 18 to separation zone 19, from which hydrogen separated from the treated feedstock is recycled through line 20 to hydrotreating zone 16. In zone 19, water entering through line 21 is used to scrub ammonia and other contaminants from the incoming hydrocarbon stream, and the ammonia, water and other contaminants are withdrawn from zone 19 through line 22. The scrubbed feedstock is passed through line 8 to distillation column 9 and thence to hydrocracking zone 2.

Referring now to FIG. 2, a hydrocarbon feedstock, as previously described, which in this case may boil above 400° F., is passed through line 29 to hydrotreating zone 30 containing a catalyst, as previously described, having hydrofining and/or hydrogenation activity. The feedstock is hydrofined and/or hydrogenated, and partially hydrocracked, if desired, in zone 30, at conditions previously described, in the presence of hydrogen supplied through line 31. The effluent from zone 30 is passed through line 32, without intervening impurity removal, into hydrocracking zone 33, where it is hydrocracked in the presence of said hydrocracking catalyst comprising a layered clay-type crystalline aluminosilicate cracking component, and 0.01 to 2.0 weight percent, based on said cracking component, of platinum, palladium or iridium, and 0.01 to 2.0 weight percent, based on said cracking component, of rhenium. Said catalyst may contain other catalytic components, and a separate second catalyst may be present in zone 33, as described in connection with zone 2 in FIG. 1. Hydrotreating zone 30 and hydrocracking zone 33 may be located in separate reactor shells, which may be operated at different pressures. Alternatively, and in a preferred manner of operation, hydrotreating zone 30 and hydrocracking zone 33 may be separate catalyst beds located in a single pressure shell 34, and the effluent from zone 30 may be passed to zone 33 without intervening pressure letdown, condensation or impurity removal. The effluent from zone 33 is passed through line 35 to separation zone 36, from which hydrogen is recycled through line 37 to hydrotreating zone 30. All or a portion of the recycled hydrogen may be passed through line 38 to hydrocracking zone 33, if desired. In separation zone 36, water entering through line 40 is used to scrub ammonia and other contaminants from the incoming hydrocarbon stream, and the ammonia, water and other contaminants are withdrawn from zone 36 through line 41. The effluent from zone 36 is passed through line 42 to distillation column 43, where it is separated into fractions, including a $C_4^-$ fraction which is withdrawn through line 44, a $C_5$—180° F. fraction which is withdrawn through line 45, a 180°–400° F. fraction which is withdrawn through line 46, and a fraction boiling above 400° F. which is withdrawn through line 47. The fraction in line 47 may be recycled through lines 48 and 49 to hydrocracking zone 33. All or a portion of the fraction in line 48 may be recycled to hydrotreating zone 30 through line 50, if desired.

Still referring to FIG. 2, in accordance with another embodiment of the present invention, the 180°–400° F. fraction in line 46 may be passed to a catalytic reforming zone 55, where it may be reformed in the presence of a conventional catalytic reforming catalyst under conventional catalytic reforming conditions to produce a catalytic reformate, which is withdrawn from zone 55 through line 56.

Still referring to FIG. 2, in another embodiment of the present invention, all or a portion of the fraction in line 47 may be passed through line 57 to catalytic cracking zone 58, which may contain a conventional catalytic cracking catalyst and which may be operated under conventional catalytic cracking conditions, and from which a catalytically cracked effluent may be withdrawn through line 59.

EXAMPLES

The following examples are given for the purpose of further illustrating the practice of the process of the present invention. However, it is to be understood that these examples are not intended in any way to limit the scope of the present invention.

Example 1

A catalyst consisting of rhenium and a layered clay-type crystalline aluminosilicate (Catalyst A, a comparison catalyst) was prepared in the following manner.

These starting materials were used:

(1) 500 grams of a layered synthetic crystalline aluminosilicate mineral as described in Granquist U.S. Pat. 3,252,757;

(2) 1000 cc. of an aqueous solution of perrhenic acid ($HReO_4$), containing 10.8 grams of rhenium.

The mineral, in lumpy powder form, was introduced into a Hobart kitchen blender, followed by slow addition of the perrhenic acid solution while stirring, to form a pasty mass. The pasty mass was transferred to a dish and dried at 150° F. for approximately 16 hours. The resulting dried material was pressed through a 60-mesh screen to obtain fine granules. The granules were blended with a 1% Sterotex lubricant binder, and tabletted. The tablets were calcined in flowing air for 2 hours at 950° F. The tabletted, calcined, rhenium-containing material was crushed, and a resulting 8–16 mesh fraction thereof was separated for use as a catalyst in the process of the present invention. This catalyst contained an amount of rhenium approaching the theoretical amount based on the amounts of ingredients used. This indicates that, although rhenium oxides normally are quite volatile, in this method of preparation only a small amount of rhenium is lost during drying and calcination.

Example 2

A layered aluminosilicate-palladium catalyst (Catalyst B, a comparison catalyst) was prepared in the following manner.

These starting materials were used:

(1) 500 grams of a layered clay-type aluminosilicate mineral as described in Granquist U.S. Pat. 3,252,757, in finely divided form.

(2) 6.8 grams of tetra ammino palladium nitrate [Pd(NH$_3$)$_4$](NO$_3$)$_2$, dissolved in 700 ml. of H$_2$O.

The layered aluminosilicate in powder form was mixed with the tetra ammino palladium nitrate solution, to form a pasty mass. The pasty mass was dried in a vacuum oven for 6 hours at room temperature, then at 200°–250° F. for approximately 16 hours. The resulting material was tabletted, and then calcined in flowing dry air for 4 hours at 460° F., then for 4 hours at 900° F. The resulting catalyst upon analysis was found to contain 0.5 weight percent palladium, calculated as metal.

Example 3

Catalyst B of Example 2 was impregnated with rhenium by soaking said catalyst for 15 minutes in 100 cc. of solution containing 2.47 g. of rhenium, added as perrhenic acid. The excess solution was drained, the catalyst was dried for 2 hours at 250° F. and was activated in flowing air at 950° F. for 2 hours. The resulting catalyst (Catalyst C, a catalyst according to the present invention) thus contained 0.5% palladium and 0.5% rhenium.

Example 4

The catalysts of the above examples were used to hydrocrack a portion of a light catalytic cycle oil feedstock of the following description:

Gravity, ° API _____ 30.1
Aniline Point, ° F. _____ 132
Sulfur content, p.p.m. _____ 5
Nitrogen content, p.p.m. _____ 0.3
ASTM D–1160 Distillation:
   ST/5 _____ 409/446
   10/30 _____ 460/486
   50 _____ 523
   70/90 _____ 572/632
   95/EP _____ 673/732

The hydrocracking was accomplished, on a recycle liquid basis, at a pressure of 1200 p.s.i.g., a liquid hourly space velocity of 0.9, a per-pass conversion of 60 liquid volume percent below 400° F., and a hydrogen supply rate of approximately 7000 s.c.f./bbl. The following results were obtained:

|  | Catalyst | | |
|---|---|---|---|
|  | A | B | C |
| Starting temperature, °F | 566 | 490 | 500 |
| Fouling rate, ° F./hr | 0.06 | 0.11 | 0.02 |
| C$_5$+ liquid yield, wt. percent | 91.5 | 90 | 91.5 |
| Temperature after 1,000 hrs., ° F | 626 | 600 | 520 |

Of these catalysts, Catalyst C is the supperior catalyst, because its low fouling rate far offsets its slightly lower activity. After only 1000 hours operation, Catalyst C is more active than Catalyst B, more active than Catalyst A, and has a lower fouling rate than either. Furthermore, use of Catalyst C results in a significantly higher C$_5$+ gasoline yield than Catalyst B.

Example 5

The 180°–400° F. portion of the product of Example 4, resulting from use of Catalyst C, is catalytically reformed, using a conventional reforming catalyst and conventional reforming conditions, and is found to be a superior feedstock for this operation. The catalytic reformate is combined with the C$_5$—180° F. portion of the product of Example 4, to produce a gasoline pool.

Example 6

The 400° F.+ portion of the product of Example 4, resulting from use of Catalyst C, is recycled to the catalytic cracking unit which produced the light cycle oil feed used in Example 4. This upgrades the total feed to the catalytic cracking unit, and causes decreased coke production and increased gasoline production in that unit. These improved results are made possible because of the improved characteristics of the 400° F.+ materials recycled from the hydrocracking zone to the catalytic cracking unit, compared with the approximately 400° F.+ light cycle oil supplied to the hydrocracking zone from the catalytic cracking unit.

Example 7

A catalyst prepared exactly as in Example 3, and having the same composition as Catalyst C of Example 3, is used to hydrocrack another portion of the same light cycle oil hydrocarbon feedstock that is referred to in Example 4. The hydrocracking is accomplished on a once-through basis, that is, with the 400° F.+ portion of the product not being recycled to the hydrocracking zone.

Example 8

The 180°–400° F. portion of the product of Example 7 is catalytically reformed, using a conventional reforming catalyst and conventional reforming conditions, and is found to be a superior feedstock for this operation. The catalytic reformate is combined with the C$_5$—180° F. portion of the product of Example 7, to produce a gasoline pool.

Example 9

A first bed of hydrocracking catalyst prepared exactly as in Example 3, and having the same composition as Catalyst C of Example 3, is placed in a reactor. A second bed of catalyst is placed in the reactor above the first bed. The volume of the second bed is 25% of the total catalyst volume. The catalyst in the second bed, prepared by impregnation of metals on silica-alumina pellets, has the following composition:

Weight percent
NiO _____ 7.6
MoO$_3$ _____ 27.0
SiO$_2$ _____ 14.4
Al$_2$O$_3$ _____ 51.0

Another portion of the same light cycle oil feedstock that is referred to in Example 4 is passed downwardly through both catalyst beds in the reactor together with added hydrogen, the hydrogen and cycle oil sequentially contacting the catalyst beds, with no product or impurity removal between beds.

Example 10

The 180°–400° F. portion of the product of Example 9 is catalytically reformed, using a conventional reforming catalyst and conventional reforming conditions, and is found to be a superior feedstock for this operation. The catalytic reformate is combined with the C$_5$—180° F.

portion of the product of Example 9 to produce a gasoline pool.

CONCLUSIONS

Applicant does not intend to be bound by any theory for the unexpected superior activity and stability of the catalysts of the present invention. However, he assumes that the favorable results are largely attributable to: (1) a different, and more favorable, equilibrium at a given operating temperature for the system consisting of rhenium metal, the various rhenium oxides, the various rhenium sulfides, platinum, palladium or iridium metal, the various oxides of platinum, palladium or iridium, the various sulfides of platinum, palladium or iridium, and sulfur and hydrogen, than for the system consisting of platinum metal, platinum oxide, platinum sulfide, sulfur and hydrogen, which provides a hydrocracking catalyst superior to the Rabo et al. noble-metal-containing catalyst; and (2) an interaction between the effect of rhenium or a rhenium compound and said layered clay-type crystalline aluminosilicate cracking component that produces more favorable hydrocracking results than are produced by any interaction between the effect of rhenium or a rhenium compound and a gel-type silica-alumina cracking component such as is used in the Wilson catalyst.

It has been known that the process of the present invention has advantages over conventional hydrocracking processes, particularly in that the hydrocracking catalyst comprising said layered clay-type crystalline aluminosilicate cracking component, a rhenium or rhenium-compound hydrogenating component, and a hydrogenating component selected from platinum, palladium and iridium and compounds of platinum, palladium and iridium, is nitrogen-tolerant and sulfur-tolerant, has a high stability, and has high cracking activity.

Although only specific embodiments of the present invention have been described, numerous variations can be made in these embodiments without departing from the spirit of the invention, and all such variations that fall within the scope of the appended claims are intended to be embraced thereby.

What is claimed is:

1. A hydrocarbon conversion catalyst comprising: (a) a layered crystalline clay-type aluminosilicate component, said layered aluminosilicate having, prior to drying and calcining of said catalyst, the empirical formula $$n\text{SiO}_2:\text{Al}_2\text{O}_3:m\text{AB}:x\text{H}_2\text{O}$$

where the layer lattices comprise said silica, said alumina, and said B, and where $n$ is from 2.4 to 3.0
$m$ is from 0.2 to 0.6
A is one equivalent of an exchangeable cation having a valence not greater than 2, and is external to the lattice,
B is chosen from the group of negative ions which consists of $F^-$, $OH^-$, $\frac{1}{2}O^{--}$ and mixtures thereof, and is internal in the lattice, and
$x$ is from 2.0 to 3.5 at 50% relative humidity, said mineral being characterized by a $d_{001}$ spacing at said humidity within the range which extends from a lower limit of about 10.4 angstroms to an upper limit of about 12.0 angstroms when A is monovalent, to about 14.7 angstroms when A is divalent, and to a value intermediate between 12.0 angstroms and 14.7 angstroms when A includes both monovalent and divalent cations; and (b) 0.01 to 2.0 weight percent, based on said aluminosilicate component and calculated as the metal, of a hydrogenating component selected from platinum and compounds thereof, palladium and compounds thereof, and iridium and compounds thereof; and (c) 0.01 to 2.0 weight percent, based on said aluminosilicate component and calculated as the metal, of a hydrogenating component selected from rhenium and compounds of rhenium.

2. A catalyst as in claim 1, which further comprises a matrix containing a component selected from alumina gel and silica-alumina gel.

3. A catalyst as in claim 2, which further comprises at least one hydrogenating component selected from Group VI metals and compounds thereof and nickel and compounds thereof.

4. A catalyst as in claim 2, wherein said layered clay-type crystalline aluminosilicate cracking component is in particulate form, and is dispersed through said matrix.

5. A catalyst as in claim 2, which further comprises titania.

6. A catalyst as in claim 4, wherein said layered clay-type crystalline aluminosilicate cracking component is substantially in the ammonia or hydrogen form and is substantially free of any catalytic metal or metals, and wherein said hydrogenating components are contained in said matrix.

7. A catalyst as in claim 6, which further comprises titania.

8. A catalyst as in claim 6, which further comprises tin or a compound of tin.

9. A catalyst comprising:
(A) A layer-type, crystalline, clay-like cracking component which prior to drying and calcining of said catalyst has the empirical formula $$n\text{SiO}_2:\text{Al}_2\text{O}_3:m\text{AB}:x\text{H}_2\text{O}$$

where the layer lattices comprise said silica, said alumina, and said B, and where $n$ is from 2.4 to 3.0
$m$ is from 0.2 to 0.6
A is one equivalent of an exchangeable cation having a valence not greater than 2, and is external to the lattice,
B is chosen from the group of negative ions which consists of $F^-$, $OH^-$, $\frac{1}{2}O^{--}$ and mixtures thereof, and is internal in the lattice, and
$x$ is from 2.0 to 3.5 at 50% relative humidity, said mineral being characterized by a $d_{001}$ spacing at said humidity within the range which extends from a lower limit of about 10.4 A. to an upper limit of about 12.0 A. when A is monovalent, to about 14.7 A. when A is divalent, and to a value intermediate between 12.0 A. and 14.7 A. when A includes both monovalent and divalent cations, and (B) A hydrogenerating component selected from platinum, palladium and iridium and compounds of platinum, palladium and iridium, in an amount of 0.01 to 2.0 weight percent, based on said cracking component and calculated as metal, and a hydrogenating component selected from rhenium and compounds of rhenium, in an amount of 0.01 to 2.0 weight percent, based on said cracking component and calculated as metal.

10. A catalyst as in claim 9, wherein said mineral is present in an amount of 10 to 99.9 weight percent, based on the total catalyst.

11. A catalyst as in claim 9, which further comprises a crystalline zeolitic molecular sieve component, in the amount of 1 to 50 weight percent, based on the total catalyst.

12. A catalyst as in claim 9, wherein A is chosen from the group consisting of $H^+$, $NH_4^+$, $Na^+$, $Li^+$, $K^+$, $\frac{1}{2}Ca^{++}$, $\frac{1}{2}Mg^{++}$, $\frac{1}{2}Sr^{++}$, and $\frac{1}{2}Ba^{++}$ and mixtures thereof.

13. A hydrocracking process which comprises contacting a hydrocarbon feedstock containing substantial amounts of materials boiling above 200° F. and selected from the group consisting of petroleum distillates, solvent-deasphalted petroleum residua, shale oils and coal tar distillates, in a reaction zone with hydrogen and the catalyst of claim 1, at hydrocracking conditions including a temperature in the range 400° to 950° F., a pressure in the range 800 to 3500 p.s.i.g., a liquid hourly space velocity in the range 0.1 to 5.0 and a total hydrogen supply rate of 200 to 20,000 s.c.f. of hydrogen per barrel of said feedstock, and recovering from said reaction zone valuable products, including gasoline.

14. A process as in claim 13, wherein said catalyst further comprises a component selected from the group consisting of alumina gel and silica-alumina gel.

15. A process as in claim 14, wherein said catalyst further comprises at least one hydrogenating component selected from the group consisting of Group VI metals and compounds thereof and nickel and compounds thereof.

16. A process as in claim 13, wherein said hydrocarbon feedstock contains 0.5 to 1000 p.p.m. organic nitrogen.

17. A process as in claim 13, wherein said reaction zone contains, in addition to said catalyst, a separate second catalyst comprising a hydrogenating component selected from Group VI metals and compounds thereof, a hydrogenating component selected from Group VIII metals and compounds thereof, and a component selected from the group consisting of alumina and silica-alumina.

18. A process as in claim 17, wherein said separate second catalyst is located in said reaction zone in a bed disposed above said catalyst comprising a layered clay-type crystalline aluminosilicate cracking component.

19. A hydrocracking process which comprises sequentially contacting a hydrocarbon feedstock and hydrogen with a first bed of catalyst and then with a second bed of catalyst, said catalyst beds both being located within a single elongated reactor pressure shell, said first bed of catalyst being located in an upper portion of said shell, the catalyst of said first bed comprising a hydrogenating component selected from the group consisting of Group VI metals and compounds thereof and Group VIII metals and compounds thereof and a component selected from the group consisting of alumina and silica-alumina, the catalyst of said second bed being the catalyst of claim 1, maintaining said first bed of catalyst and said second bed of catalyst at a temperature in the range 400° to 950° F. and a pressure in the range 800 to 3500 p.s.i.g. during said contacting, maintaining the total supply rate of said hydrogen into said reactor shell from 200 to 22,000 s.c.f. of hydrogen per barrel of said feedstock, and recovering a gasoline product from the effluent of said second bed of catalyst.

20. A process as in claim 19, wherein the effluent from said second bed of catalyst is separated into fractions, including a light gasoline fraction, a heavy gasoline fraction, and a fraction boiling generally higher than said heavy gasoline fraction.

21. A process as in claim 20, wherein said heavy gasoline fraction is catalytically reformed.

22. A process as in claim 20, wherein said fraction boiling generally higher than said heavy gasoline fraction is catalytically cracked.

References Cited
UNITED STATES PATENTS

| | | | |
|---|---|---|---|
| 3,132,087 | 5/1964 | Kelley et al. | 208—60 |
| 3,140,253 | 7/1964 | Plank et al. | 208—120 |
| 3,236,762 | 2/1966 | Rabo et al. | 208—111 |
| 3,252,889 | 5/1966 | Capell et al. | 208—120 |

DELBERT E. GANTZ, Primary Examiner

A. RIMENS, Assistant Examiner

U.S. Cl. X.R.
208—89; 252—455